UNITED STATES PATENT OFFICE.

BENJAMIN SILLIMAN, OF NEW HAVEN, CONNECTICUT.

IMPROVEMENT IN PURIFYING ILLUMINATING AND OTHER GASES.

Specification forming part of Letters Patent No. 153,727, dated August 4, 1874; application filed July 15, 1874.

*To all whom it may concern:*

Be it known that I, BENJAMIN SILLIMAN, of New Haven, county of New Haven and State of Connecticut, United States of America, chemist, have invented an Improved Process for the Purification of Illuminating and other Gases, and the removal and economical preservation of ammonia mingled with such gases, of which the following is a specification:

This invention relates to that class of processes employed for removing ammonia and its compounds and other impurities mixed with and produced in illuminating and other gases in the process of their manufacture; and it consists in the use of certain acid salts placed in the path of the gas for the purpose of removing ammonia and other impurities.

In carrying out my invention, I take the bye-product of acid and alkali works known as "salt-cake," and place it, in layers of convenient thickness, in boxes or other form of purifying apparatus familiarly known to gas-engineers, and such as are now in use for what is known as "dry-lime purification" or "oxide-of-iron purification," causing the gas as it comes from the hydraulic main to pass through the apparatus properly charged with salt-cake reduced to a suitable degree of fineness. This agent completely and immediately removes from the gas all ammoniacal compounds, retaining them in chemical combination in a dry state, gaining thereby an increased value in proportion to the ammonia absorbed and combined.

As all gas engineers and chemists know, the complete removal of the ammoniacal compounds from coal-gas has presented hitherto great and insurmountable difficulties, involving, by the use of water for this purpose, a serious loss of illuminating power in the gas, due to the removal by water of some of its most valuable constituents. By the use of my invention this loss is avoided. All the ammoniacal compounds are withdrawn, the illuminating power of the gas is increased, and the expense of water, which in extensive gas-works is very large, is saved to a great extent.

Salt-cake, so called, is a bye-product in the manufacture of acids and of soda, and varies in composition accordingly. That derived from the decomposition of South-American salt-peter by oil of vitriol in producing nitric and sulphuric acid contains a residue of free nitric acid and of sulphuric acid from the excess of that agent used in the process. This is nitric-acid salt-cake. More rarely potassium nitrate is used for the same purpose, and the salt-cake from it possesses similar and possibly superior powers to that from the sodium nitrate, owing to the fact that it is more completely a bisulphate. When common salt or sodium chloride is decomposed by oil of vitriol, either to produce hydrochloric acid or for sodium carbonate, the salt-cake resulting abounds in free hydrochloric acid, and retains, also, the excess of oil of vitriol. In either case the salt-cake is an anhydrous body, not deliquescent or hydroscopic, readily reduced to any desired degree of comminution, porous, and in all respects admirably adapted to absorb and retain ammonia and its compounds.

I have discovered and experimentally demonstrated that when gas containing ammonia or its compounds is passed over or through a layer or mass of salt-cake properly disposed it parts completely and at once with all its ammonia, which readily combines with the free acid of the salt-cake until it is completely saturated. The separation is so perfect that no trace of ammonia can be detected by turmeric or litmus paper in the gas after passing the salt-cake purifiers. The ammonia thus combined and removed may subsequently be separated from the salt-cake by any of the methods now in use for this purpose, leaving the soda-salt in a state fit for the soda process.

Ammonia is produced in other processes of the arts from the decomposition of organic matter containing nitrogen exhaling odors of a very offensive nature, of which impure ammonia is one of the most offensive. By the use of my process, in connection with any suitable form of condenser and without water, all the ammoniacal compounds may be removed from such offensive gases, thus abating a nuisance of no small magnitude now existing in the vicinity of many large towns. So far as I have been able to discover, my process removes from illuminating-gas in contact with the salt-cake nothing but the ammoniacal compounds, including carbonate of ammonia and ammonia sulphide, with a portion of sulpho-cyanide of ammonium, and probably, also, other compound ammoniums, the nature of which has not yet been fully determined; but all the ammoniacal compounds having been removed, the further process of purification in illuminating-gas is simplified and improved, and especially by the absence of any necessity for washing or scrubbing the gas, by the use of water and ammoniacal liquor—a process which is well understood by all gas chemists and engineers to be attended with a serious loss of illuminant power in the gas, while it involves the use of costly apparatus, and, as before mentioned, a large annual outlay for water, producing at the same time only a partial and imperfect removal of the ammonia, the residual portion of which goes forward to the consumer of gas, not only diminishing its light during burning, (beyond the loss of power already experienced from the use of water in scrubbing,) but producing also in its combustion a portion of nitric acid.

In the use of my invention, I prefer to bring the crude gas into contact with the salt-cake before it has passed the condenser, but this is a point which must be decided in a given case by local circumstances. If there is a reasonably prolonged flow of the gas from the hydraulic main of, for example, two or three hundred feet of large cooling-mains, offering a reasonably good opportunity for the deposit of tar and naphthaline, it is better to place the boxes or other form of apparatus containing the salt-cake before the condenser. To avoid the inconvenience in this case from the deposit of tar with the ammoniacal compounds, the use of a layer of breeze or broken coke before the salt-cake is desirable, in a manner familiar to all gas-engineers. This breeze will require to be changed occasionally, as it becomes coated, to prevent the arrest of flow in the gas, as indicated by the pressure-gage.

To use the salt-cake, it requires to be broken to a coarse powder and distributed upon trays in the same manner that lime and other purifying agents are now used; only that, owing to the greater firmness and porosity of the salt-cake, it may be safely used in thicker layers than can be used with lime.

The progress and completeness in the process of removing the ammonia are readily determined by the use of turmeric test-paper, or of neutral litmus-paper, the first of which turns from yellow to brown, and the second from red to blue, as soon as the salt is saturated and the free ammoniacal salts commence to flow.

The apparatus must then be changed or recharged in the same way now in use in all gas-works for lime or iron purification. Care must be taken to avoid bringing lime in contact with the salt-cake in any stage of the process, as such contact would be attended with a loss of ammonia and a frustration of the process. The power of the salt-cake to purify gas of ammonia depends, of course, on its degree of acidity, which can be determined beforehand. Salt-cake from the hydrochloric-acid process in the United States contains usually about twenty (20) per cent. of free hydrochloric with some sulphuric acid. Nitric-acid salt-cake here contains from twelve (12) to fifteen (15) per cent. of nitric acid, besides the acid-sodic sulphate; but it is in the power of the chemical manufacturer to prepare salt-cake of any desired degree of acidity, either by the use of an excess of oil of vitriol, forming bisulphate of sodium or potassium, as the case may be, or by arresting the heat of the furnace at a point which shall leave in the salt-cake the acidity requisite to best fit it for my process. The product of this process becomes much more valuable than the raw material used in it, each one (1) per cent. of ammonia it receives having a definite commercial value, which, in the case of guano, with ten (10) per cent. ammonia, is worth about six (6) dollars per unit at the present time in the United States. Coal contains an average of about one and a half (1½) per cent. of its weight of nitrogen; but by no means all of this nitrogen reappears as ammonia after distillation. A portion of it is converted into the cyanogen compounds, and a part is probably left free. The cyanides, so far as my experiments have gone, appear to be arrested by the salt-cake, and go to the account of ammonia in the end. After my process has freed illuminating-gas from its ammoniacal impurities it may be passed through any form of condenser which may be preferred, and then it must be taken to the lime or iron purifiers for the removal of the sulphur and carbonic acid, in the manner now practiced.

It is well known that the spent lime and iron oxide used in the purification of gas contains a considerable amount of ammonia, so combined that immediately on access of air the spent material commences to heat, and then exhales the odor of ammonia accompanied by offensive vapors or gases, which together have rendered the exposure of these effete products a nuisance in large towns. To avoid in part this evil the ventilation of this spent material is practiced in some cases by causing a current of atmospheric air to pass downward through the purifying-boxes, after the flow of gas has been cut off, solicited by a powerful exhauster, with a view to removing this evil. If in such cases the current of air from such spent material is carried through boxes charged, as I have herein directed, with salt-cake, all the ammonia contained in the spent lime and iron, which is now a total loss, will be saved and utilized.

In the destructive distillation of animal matters for producing bone-black and the like, or specifically for the production of ammonia, in the boiling down of animal matters, as in bone boiling and rendering, in the sweating of hides, and other like processes where animal substances are employed in a greater or less state of putrefaction or chemical change, ammonia is given off, combined with other offensive vapors or gases. If these products, which are now a source of great annoyance and injury to public health, are carried, by means of a suitable exhauster, through boxes containing salt-cake, or other acid salts, as herein described, all the ammoniacal compounds will be combined and removed. For this purpose it may be found desirable to carry such vapors first through some suitable dry condenser for the better condensation of aqueous and other vapors.

What I claim as my invention, and desire to secure by Letters Patent, is—

1. The use of salt-cake, alkaline bisulphates, or other acid salts in the removal of ammonia and its compounds in a dry-state form from illuminating-gas, or from other gases or vapors derived from the decomposition or destructive distillation of organic bodies containing nitrogen, substantially in the manner above described.

2. The use of salt-cake, alkaline bisulphates, or other acid salts in the purification of illuminating-gas, for the purpose of removing therefrom ammonia and its compounds without the use of water or ammoniacal liquors for washing or scrubbing, substantially as described.

3. The use of salt-cake, alkaline bisulphates, or other acid salts for disinfection of the vapors and gases resulting from the decomposition or destructive distillation of organic matters containing nitrogen for the purpose of removing therefrom any ammoniacal products they may contain, and also for the removal and saving of the ammoniacal compounds derived from the ventilation of spent lime and iron which has been used in the purification of illuminating-gas, substantially as described.

4. The use of salt-cake, alkaline bisulphates, or other acid salts for the purpose of collecting in a concentrated form as a dry salt ammonia and its compounds from illuminating-gas, or from any other mixture of gases and vapors containing the same, in the manner substantially as hereinbefore described.

5. The process of passing illuminating and and other gases and vapors through any apparatus charged with salt-cake, alkaline bisulphates, or other acid salts for the purpose of collecting and combining ammonia or its compounds when associated with such gases or vapors, substantially as above described.

BENJAMIN SILLIMAN.

Witnesses:
GROSVENOR S. HUBBARD,
ARTEMAS H. HOLMES.